United States Patent
Schaeffer et al.

(10) Patent No.: US 8,825,342 B2
(45) Date of Patent: Sep. 2, 2014

(54) SYSTEM AND METHOD OF PROTECTING AN ENGINE AND OTHER AIRCRAFT COMPONENTS FROM DAMAGE THAT MAY OTHERWISE OCCUR FROM A FUEL CONTROL UNIT FAILURE

(71) Applicant: Bell Helicopter Textron Inc., Fort Worth, TX (US)

(72) Inventors: Joseph M. Schaeffer, Cedar Hill, TX (US); Areian A. Kouros, Keller, TX (US); Christopher Cawelti, Keller, TX (US); Curtis L. Moore, Lewisville, TX (US); Michael D. Trantham, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 55 days.

(21) Appl. No.: 13/667,441

(22) Filed: Nov. 2, 2012

(65) Prior Publication Data

US 2014/0129111 A1      May 8, 2014

(51) Int. Cl.
| | |
|---|---|
| G06F 17/00 | (2006.01) |
| F02C 9/28 | (2006.01) |
| G01P 3/00 | (2006.01) |
| G01K 13/00 | (2006.01) |
| G01M 15/14 | (2006.01) |

(52) U.S. Cl.
USPC ............ 701/100; 415/13; 60/39.281; 60/773; 702/130; 702/145; 702/35

(58) Field of Classification Search
USPC .................. 701/100; 415/13; 60/39.281, 773; 702/130, 145, 35
See application file for complete search history.

(56) References Cited

U.S. PATENT DOCUMENTS

| 4,466,526 A * | 8/1984 | Howlett et al. ............... 477/113 |
| 6,434,473 B1 * | 8/2002 | Hattori .......................... 701/100 |
| 2011/0301822 A1 * | 12/2011 | Aurousseau .................. 701/100 |

FOREIGN PATENT DOCUMENTS

| EP | 1205654 A2 * | 5/2002 | ............... F02C 9/46 |
| EP | 1355054 A2 | 10/2003 | |
| FR | 2942499 * | 8/2010 | ............. F01D 21/14 |
| FR | 2942499 A1 | 8/2010 | |
| GB | 2214331 A | 8/1989 | |
| GB | 2307950 A | 6/1997 | |

OTHER PUBLICATIONS

European Search Report in related European Application No. 12198693.9, dated Oct. 29, 2013, 7 pages.

* cited by examiner

*Primary Examiner* — Mary Cheung
*Assistant Examiner* — Brian P Sweeney
(74) *Attorney, Agent, or Firm* — Noah A. Tevis

(57) ABSTRACT

The system for mitigating an overspeeding condition of a turbine engine can include a sensor for measuring an actual speed of a gas generator turbine of the turbine engine and a processor for deriving a delta, the delta being a comparison between the actual speed of the gas generator turbine and a predicted gas generator turbine speed. The system is configured for detecting the overspeeding condition when delta is higher than a predetermined threshold. A method of detecting an overspeeding condition during operation of a turbine engine can include measuring an actual speed of a gas generator turbine, then evaluating a delta between the actual speed of the gas generator turbine and a predicted speed of the gas generator turbine, then comparing the delta to a threshold value.

13 Claims, 4 Drawing Sheets

SYSTEM AND METHOD OF PROTECTING AN ENGINE AND OTHER AIRCRAFT COMPONENTS FROM DAMAGE THAT MAY OTHERWISE OCCUR FROM A FUEL CONTROL UNIT FAILURE

BACKGROUND

1. Technical Field

The present disclosure relates to a system and method for protecting an engine and other aircraft components from damage that may otherwise occur from a fuel control unit failure.

2. Description of Related Art

Conventionally, a failure of fuel control unit (high-side failure) on a turbine engine was detected by monitoring of the power turbine speed (Np). Upon detection, a remedy was automatically employed, such as shutdown of the engine.

There are significant shortcomings of using power turbine speed (Np) in the detection of a high-side failure, such as the slowness of detection, which are discussed further herein. Hence, there is a need for an improved method and system for detecting and remedying a high-speed failure in a turbine engine.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method of the present disclosure are configured to protect aircraft components from an engine overspeeding condition that may result from a fuel control unit failure. For example, a failure mode of a fuel control unit malfunction can include an oversupply of fuel to the turbine engine, thereby causing an overspeeding condition in the engine. The overspeeding condition can result in damage to aircraft components, such as the engine, generator, gearbox, rotor system, hydraulic pump, and electrical system, to name a few examples. Further, an overspeeding condition can result in an unintended aircraft takeoff, particularly when the aircraft is a tiltrotor aircraft that may have a high amount of built-in twist in the rotor blades. The system and method of the present disclosure are configured to mitigate the negative impacts of an overspeeding condition on the engine. These and other advantages of the system and method are further described herein. Certain embodiments of the present disclosure may include some, all, or none of the above advantages. One or more other technical advantages may be readily apparent to those skilled in the art from the figures, descriptions, and claims included herein.

Figure 1:
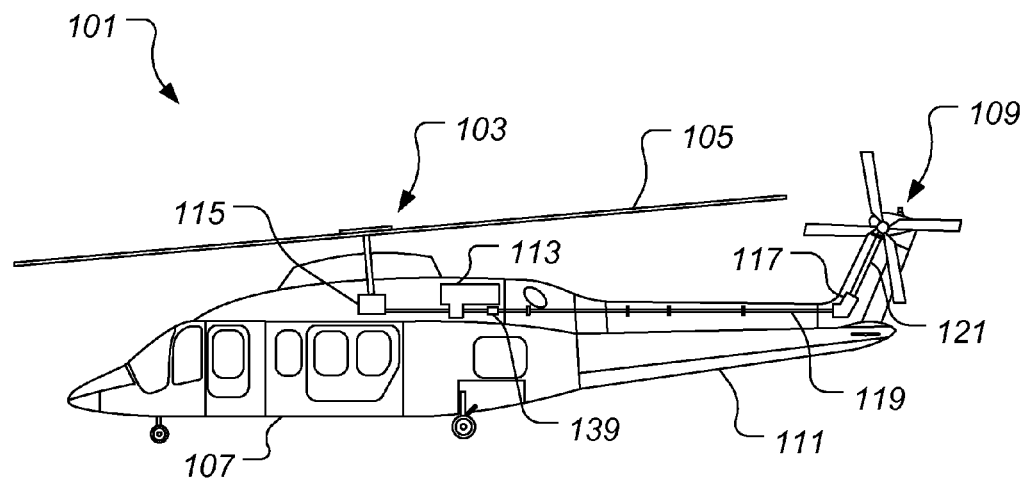
FIG. 1 is a side view of an rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 further includes a fuselage 107, anti-torque system 109, and an empennage 111. Torque is supplied to rotor system 103 and anti-torque system 109 with at least one engine 113. A main rotor gearbox 115 is operably associated with the engine main output driveshaft and the main rotor mast. Further, a reduction speed gearbox 139 and an intermediate gearbox 117 can be operably associated with a tail rotor drive shaft 119 and a tail rotor drive shaft 121.

Figure 2:
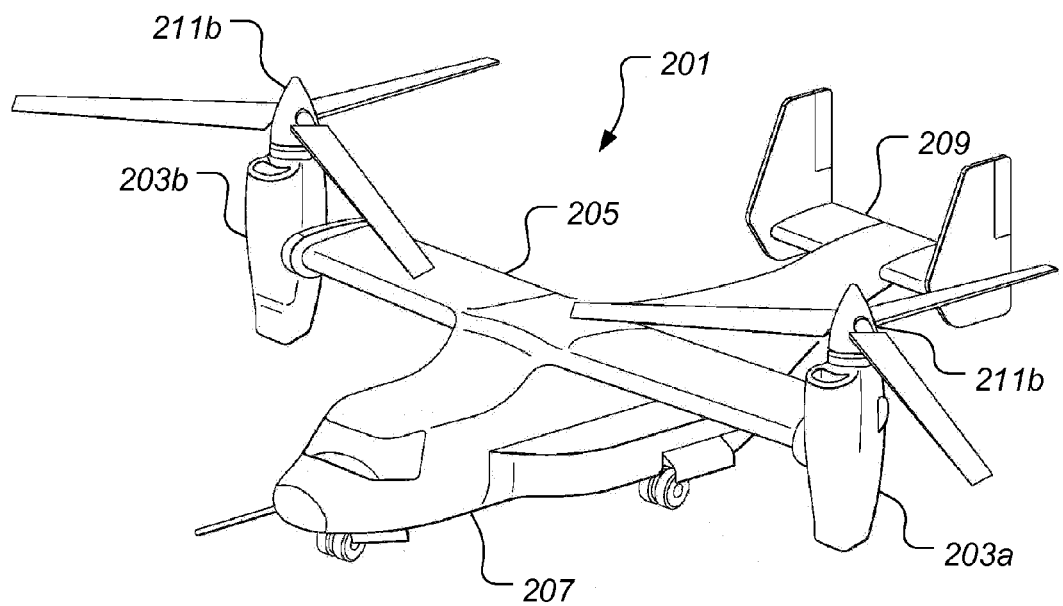
FIG. 2 is a perspective view of a tilt rotor aircraft, according to one example embodiment.

Referring now also to FIG. 2 in the drawings, a tilt rotor aircraft 201 is illustrated. Tilt rotor aircraft 201 can include nacelles 203a and 203b, a wing 205, a fuselage 207, and a tail member 209. Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal.

Rotorcraft 101 and tilt rotor aircraft 201 are merely illustrative of the wide variety of aircraft and vehicles that are particularly well suited to take advantage of the method and system of the present disclosure. It should be appreciated that other vehicles having a turbine engine can implement the system and method of the present disclosure.

Figure 3:
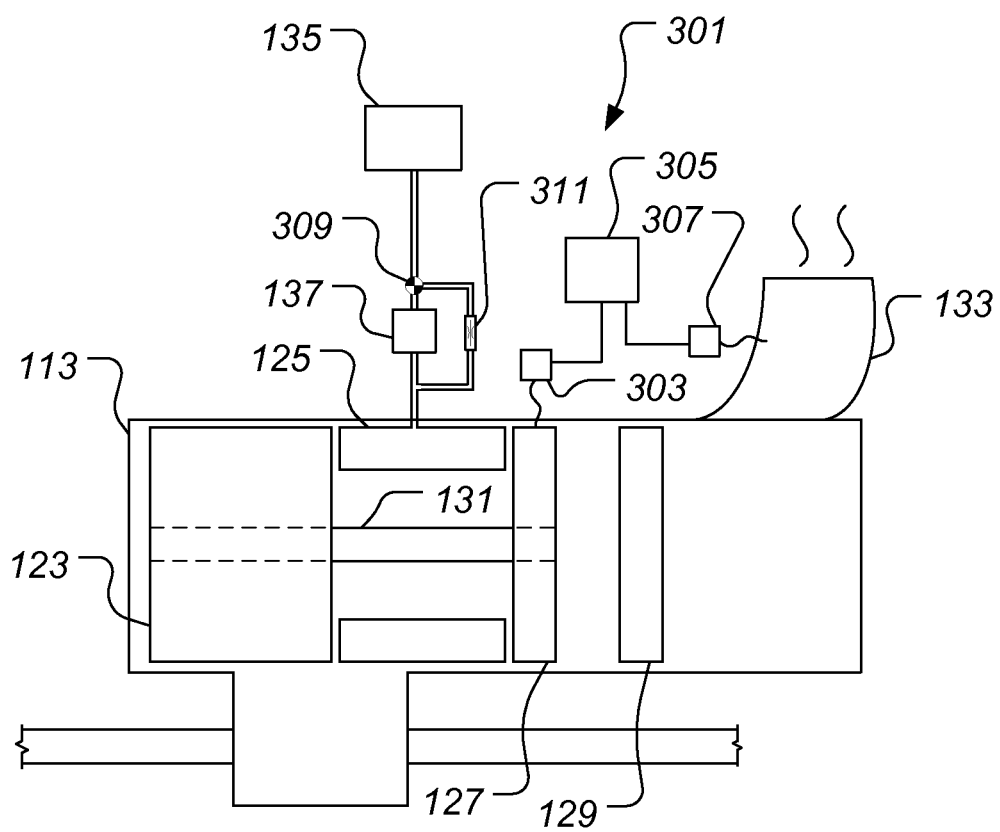
FIG. 3 is a schematic view of a system for detecting and protecting aircraft components from an engine overspeeding condition, according to one example embodiment.

Referring now also to FIG. 3 in the drawings, a system 301 is illustrated in conjunction with engine 113 of rotorcraft 101.

It should be appreciated that engine 113 is schematically illustrated and that any given implementation of engine 113 can take on a wide variety of configurations. Engine 113 can include a compressor 123, a combustion chamber 125, a gas generator turbine 127, and a power turbine 129. A combination of compressor 123 and gas generator turbine 127 can be referred to as a gas generator. A drive shaft 131 can provide torque transfer between compressor 123 and gas generator turbine 127. An exhaust duct 133 provides for the discharge of hot exhaust gas from engine 113. A fuel supply 135 is configured to provide fuel flow to combustion chamber 125 via a fuel control unit 137. Fuel control unit 137 can be selectively controlled by a pilot and/or engine system controls for selectively controlling the output power of engine 113. It should be appreciated that system 301 can be implemented in conjunction with each engine located in the aircraft. For example, an aircraft having two engines can have two systems 301.

System 301 is configured to protect aircraft components from an engine overspeeding condition that may result from a failure of fuel control unit 137. For example, a failure mode of a malfunction of fuel control unit 137 can include an oversupply of fuel to engine 113, thereby causing an overspeeding condition in the engine 113. System 301 is also configured to prevent an unintended takeoff that may otherwise occur from a failure of fuel control unit 137 while the aircraft is on the ground.

Figure 4:
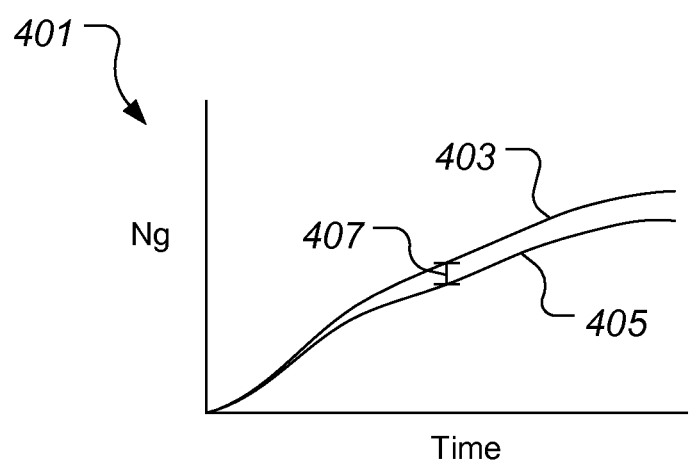
FIG. 4 is a graph illustrating a delta between a predicted gas generator turbine speed and a measured gas generator turbine speed, according to one example embodiment.

System 301 can include a sensor 303 configured for measuring an actual gas generator turbine speed (Ng). Sensor 303 can be any variety of suitable sensors capable of measuring rotational speed of gas generator turbine 127, such as a magnetic pickup sensor for example. Sensor 303 is in data communication with a processor 305. Processor 305 is configured for actively comparing a measured gas generator turbine speed (Ng) with a predicted gas generator turbine speed, the predicted gas generator turbine speed being a function of the commanded amount of fuel flow to fuel control unit 137. Referring also to FIG. 4, a graph 401 graphically illustrates a delta 407 between the predicted gas generator turbine speed 405 and the measured gas generator turbine speed 403. If delta 407 is greater than a predetermined threshold value, then a malfunction of fuel control unit 137 can be identified. In one embodiment, a threshold value is surpassed when the measured gas generator turbine speed 403 is 113% of the predicted gas generator turbine speed 405; however, it should be appreciated that the exact threshold value is implementation specific. Further, several different threshold values can be used depending on the operational situation of the aircraft, as discussed further herein with regard to method 501.

In one embodiment, processor 305 uses a filter in the analysis of comparing delta 407 between the predicted gas generator turbine speed 405 and the measured gas generator turbine speed 403 to the threshold value so that steady state error between the predicted gas generator turbine speed 405 and the measured gas generator turbine speed 403 is removed. The filter can be operable to remove steady state error that may result from mechanical and electrical tolerances in the fuel control interfaces that can impact the accuracy of the calculation of delta 407.

System 301 can also include a sensor 307 configured for measuring exhaust temperature (MgT) as a redundancy to the comparison between delta 407 and the predetermined threshold value. For example, before a downstream command is made that can cause a reduction or termination of fuel flow to engine 113, processor 305 can be configured to confirm malfunction of fuel control unit 137 by a comparable increase in exhaust temperature (MgT).

In one embodiment, system 301 is configured such that once a malfunction of fuel control unit 137 is determined, a command is sent to a valve 309 so that fuel is redirected from fuel control unit 137 to a fluid path having an inline restrictor valve 311. Restrictor valve 311 is configured to restrict fuel flow to a rate that prevents an overspeeding of engine 113 while still providing enough fuel for engine 113 to operate. It should be appreciated that restrictor valve 311 is merely illustrative of an implementation specific device for limiting fuel flow to combustion chamber 125 of engine 113. In an another embodiment, valve 309 is configured to completely terminate fuel flow to engine combustion chamber 125 of engine 113 instead of redirecting fuel through restrictor valve 311.

Figure 5:
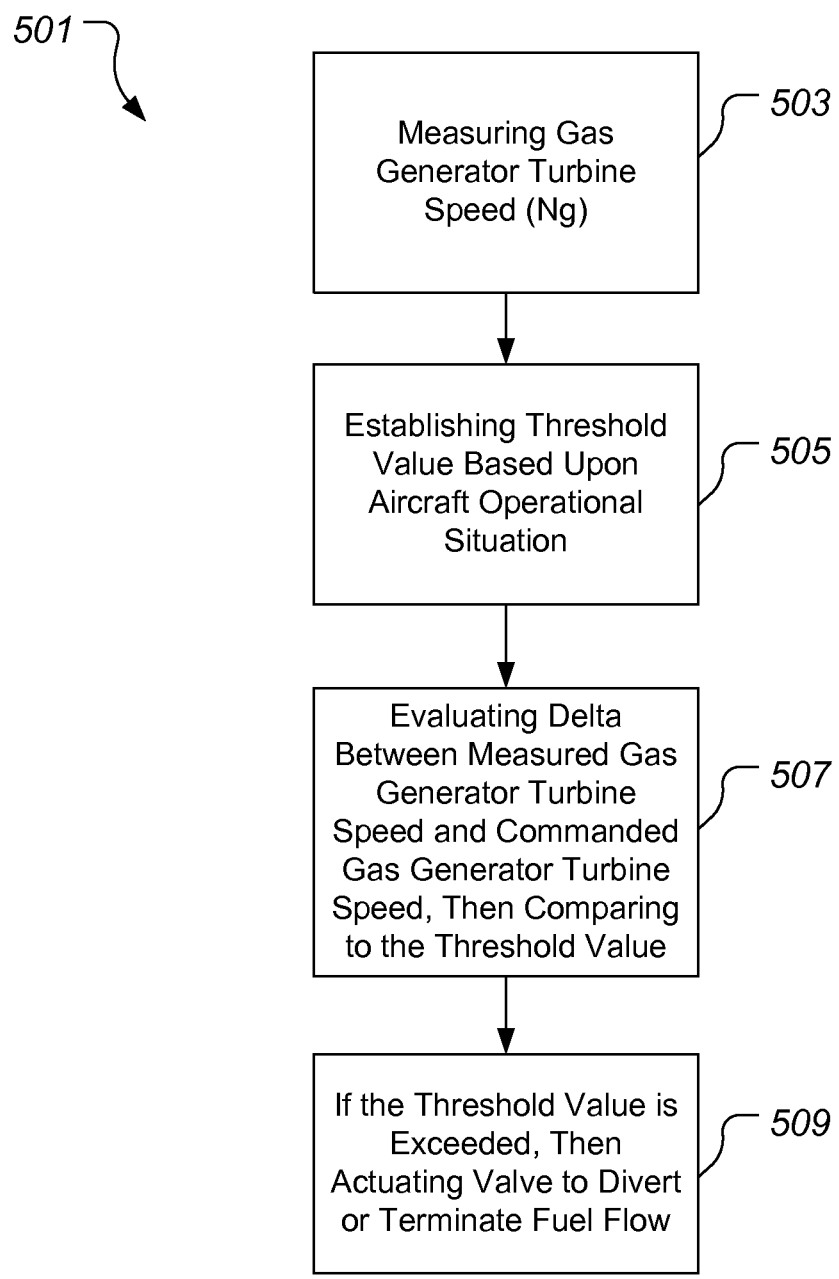
FIG. 5 is a schematic view of a method for detecting and protecting aircraft components from an engine overspeeding condition, according to one example embodiment.

Referring now also to FIG. 5, a method 501 is configured to protect aircraft components from an engine overspeeding condition that may result from a failure of fuel control unit 137. Method 501 is also configured to prevent an unintended takeoff that may otherwise occur from a failure of fuel control unit 137 while the aircraft is on the ground. Method 501 can include a step of measuring the speed of gas generator turbine 127, thereby deriving a gas generator turbine speed (Ng). Step 503 can be implemented by using sensor 303 described further herein with regard to system 301.

Method 501 can also include a step 505 for establishing a threshold value based upon the operational situation of the aircraft. For example, if the aircraft (such as tilt rotor aircraft 201 shown in FIG. 2) is on the ground, then a lower threshold value can be used so that the fuel flow to the engine is reduced or terminated in a shorter amount of time as compared to the use of a higher threshold value. For example, an on the ground threshold value can be surpassed when the measured gas generator turbine speed (illustrated as 403 in FIG. 4) is approximately 105% of the predicted gas generator turbine speed (illustrated as 405 in FIG. 4), whereas an in-flight threshold value can be surpassed when the measured gas generator turbine speed is approximately 113% of the predicted gas generator turbine speed; however, it should be appreciated that the exact ground threshold values and in-flight threshold values are implementation specific.

Method 501 can also include a step 507 for evaluating how the delta (illustrated as 407 in FIG. 4) between the measured gas generator turbine speed and the predicted gas generator turbine speed compares to the threshold value. If the delta does not exceed the threshold value, then no action is taken. On the other hand, if the delta does exceed the threshold value, then a step 509 can be implemented. In one embodiment of method 501, step 507 can also include confirming a malfunction of the fuel control unit 137 by verifying that an increase in gas generator turbine 127 speed is also resulting in a equivalent increase in exhaust temperature (MgT).

Step 509 can include actuating valve 309 so that fuel flow is diverted through restrictor valve 311. In another embodiment, actuating valve 309 causes fuel flow to be terminated, as discussed further herein with regard to system 301.

Figure 6:
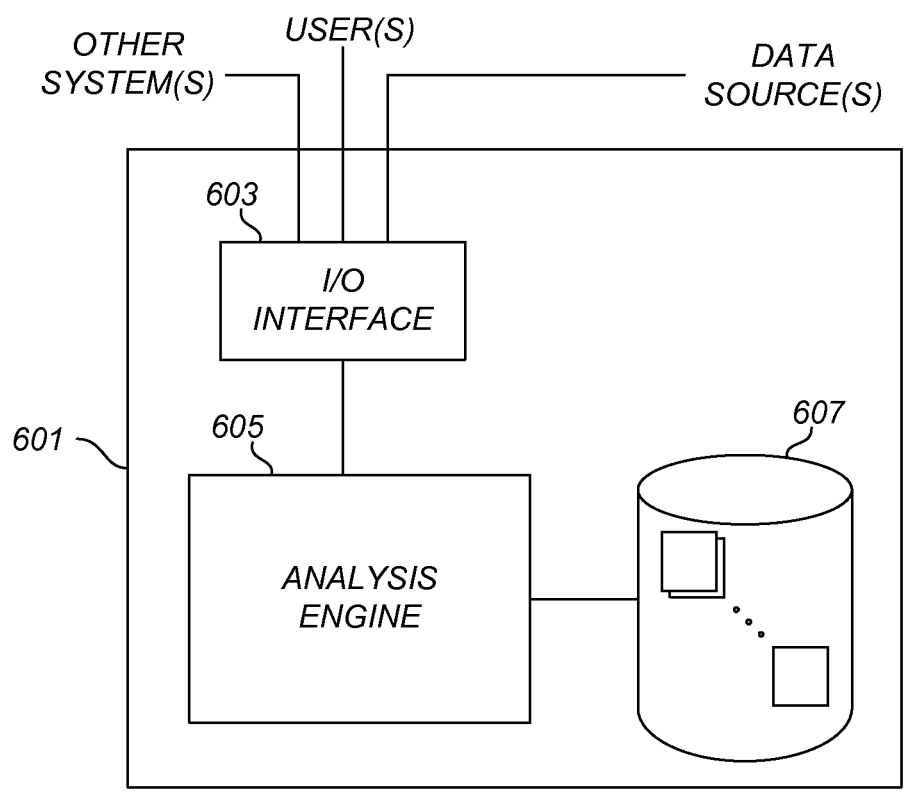
FIG. 6 is a schematic view of a computer system, according to one example embodiment.

Referring now also to FIG. 6, a computer system 601 is schematically illustrated. System 601 is configured for performing one or more functions with regard to the operation of system 301 and method 501, further disclosed herein. Further, any processing and analysis can be partly or fully performed by computer system 601. Computer system 601 can be partly or fully integrated with other aircraft computer systems.

The system 601 can include an input/output (I/O) interface 603, an analysis engine 605, and a database 607. Alternative embodiments can combine or distribute the input/output (I/O) interface 603, analysis engine 605, and database 607, as desired. Embodiments of the system 601 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the system 601. The I/O interface 603 can be configured for allowing one or more users to input information to the system 601 via any known input device. Examples can include a keyboard, mouse, touch screen, and/or any other desired input device. The I/O interface 603 can be configured for allowing one or more users to receive information output from the system 601 via any known output device. Examples can include a display monitor, a printer, cockpit display, and/or any other desired output device. The I/O interface 603 can be configured for allowing other systems to communicate with the system 601. For example, the I/O interface 603 can allow one or more remote computer(s) to access information, input information, and/or remotely instruct the system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the system 601 to perform one or more of the tasks described herein.

The database 607 provides persistent data storage for system 601. While the term "database" is primarily used, a memory or other suitable data storage arrangement may provide the functionality of the database 607. In alternative embodiments, the database 607 can be integral to or separate from the system 601 and can operate on one or more computers. The database 607 preferably provides non-volatile data storage for any information suitable to support the operation of system 301 and method 501, including various types of data discussed further herein.

The analysis engine 605 can be configured for comparing the delta between the measured gas generator turbine speed and the commanded gas generator turbine speed, then comparing the delta to the threshold value. Further, analysis engine can be in lieu of processor 305, or integrated therewith. The analysis engine 605 can include various combinations of one or more processors, memories, and software components.

System 301 and method 501 provide significant advantages over conventional means of detecting and mitigating a fuel control unit failure that may result in an overspeeding condition in the engine. The amount of time that is required to detect and mitigate an overspeeding condition is very critical. For example, in one illustrative embodiment, approximately 1.0 seconds after the fuel control unit failure, the rotor system can reach the design maximum. At 1.2 seconds, the overspeeding condition may cause a failure of a power supply that may be operable with other flight critical systems. At 1.6 seconds, a complete inspection of the drive system may be required. At 2.2 seconds, a qualification limit can be reached for the aircraft generators. As such, it is very important to detect and mitigate the overspeeding condition as quickly as possible. The system and method of the present disclosure achieve a speedy detection and mitigation by analyzing the gas generator turbine speed, whereas analyzing power turbine speed is slow and response can significantly lag that of the gas generator turbine speed. Further, the method and system of the present disclosure can effectively prevent an untended aircraft takeoff by using quicker response methodology compared to that of an in-flight aircraft.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A system for mitigating an overspeeding condition of a turbine engine, the system comprising:
   a sensor for measuring a measured speed of a gas generator turbine of the turbine engine;
   a processor operable to determine a difference between the measured speed of the gas generator turbine and a predicted gas generator turbine speed, the predicted gas generator turbine speed is based in part upon a commanded fuel flow to the turbine engine, so as to thereby detect the overspeeding condition when the difference between the measured speed of the gas generator turbine is higher than a predetermined threshold;
   a valve configured to redirect a fuel flow supplied to the turbine engine, the valve being actuatable upon a detection of the overspeeding condition; and
   a restrictor valve downstream of the valve and sized to limit the fuel flow supplied to the turbine engine to a predefined flow rate;
   wherein the resulting fuel flow supplied to the turbine engine flows completely downstream of both the valve and the restrictor valve.

2. The system according to claim 1, further comprising:
   an exhaust sensor configured for measuring an exhaust temperature;
   wherein the exhaust temperature can be analyzed by the processor for confirming the overspeeding condition such that the processor is adapted is confirm the overspeeding condition by comparing the exhaust temperature to the measured speed of the gas generator turbine.

3. The system according to claim 1, wherein the valve is further operable to terminate fuel to the turbine engine upon a detection of the overspeeding condition.

4. The system according to claim 1, wherein the turbine engine is configured to provide power for a rotorcraft propulsion system.

5. The system according to claim 1, wherein the turbine engine is configured to provide power for a tilt rotor propulsion system.

6. The system according to claim 1, further comprising:
an aircraft housing the turbine engine;
wherein the predetermined threshold is a first value when the aircraft is on the ground, but the predetermined threshold is a second value when the aircraft is in-flight.

7. The system according to claim 6, wherein the first value is smaller than the second value.

8. The system according to claim 1, wherein the overspeeding condition is a result of a failure of a fuel control unit.

9. A method of detecting an overspeeding condition during operation of a turbine engine, the method comprising:
measuring with a sensor a measured, speed of a gas generator turbine of the turbine engine;
determining, with a processor, a difference between the measured speed of the gas generator turbine and a predicted speed of the gas generator turbine;
comparing the difference to a predetermined threshold value;
determining an overspeeding condition if the difference is higher than the predetermined threshold value;
actuating a valve, in response to the overspeeding condition, so as to redirect the fuel flow through a restrictor valve that is downstream of the valve, so that the resulting fuel flow supplied to the turbine engine flows completely downstream of the valve and the restrictor valve.

10. The method according to claim 9, wherein the predicted speed of the gas generator turbine is based in part upon a commanded fuel flow to the turbine engine.

11. The method according to claim 9, further comprising:
establishing the predetermined threshold value based upon whether an aircraft containing the turbine engine is on the ground or in the air.

12. The method according to claim 9, further comprising:
measuring an exhaust temperature with a temperature sensor;
confirming the overspeeding condition by comparing the exhaust temperature to the measured speed of the gas generator turbine with the processor.

13. The method according to claim 12, wherein the step of confirming the overspeeding condition includes detecting an increase in exhaust temperature that corresponds with the difference between the measured speed of the gas generator turbine and the predicted speed of the gas generator turbine.

* * * * *